(12) United States Patent
Zhou et al.

(10) Patent No.: US 11,238,654 B2
(45) Date of Patent: Feb. 1, 2022

(54) OFFLINE SHOPPING GUIDE METHOD AND APPARATUS

(71) Applicant: Advanced New Technologies Co., Ltd., Grand Cayman (KY)

(72) Inventors: Le Zhou, Zhejiang (CN); Li Chen, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/686,797

(22) Filed: Nov. 18, 2019

(65) Prior Publication Data
US 2020/0090411 A1   Mar. 19, 2020

Related U.S. Application Data

(63) Continuation of application No. PCT/CN2018/094782, filed on Jul. 6, 2018.

(30) Foreign Application Priority Data

Jul. 7, 2017 (CN) .......................... 201710552347.0

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/011* (2013.01); *G06K 9/00671* (2013.01);
(Continued)

(58) Field of Classification Search
None
See application file for complete search history.

(56) References Cited

U.S. PATENT DOCUMENTS 10,257,179 B1 * 4/2019 Saylor ..................... H04L 63/08
10,262,331 B1 * 4/2019 Sharma ................... H04L 67/22
(Continued)

FOREIGN PATENT DOCUMENTS

| CN | 103534720 A | 1/2014 |
| CN | 104657870 A | 5/2015 |

(Continued)

OTHER PUBLICATIONS

Rallapalli et al, 'Enabling Physical Analytics in Retail Stores Using Smart Glasses', MobiCom'14. (Year: 2014).*
(Continued)

*Primary Examiner* — Patrick F Valdez
(74) *Attorney, Agent, or Firm* — Finnegan, Henderson, Farabow, Garrett & Dunner, LLP

(57) ABSTRACT

Embodiments of the specification provide offline shopping guide methods and apparatuses. One method includes: obtaining a user identifier (ID) of a user and a scene ID of a shopping venue; obtaining historical offline shopping data and historical online shopping data of the user according to the user ID, and obtaining commodity information of the shopping venue according to the scene ID; obtaining a commodity to be recommended to the user according to the historical offline shopping data, the historical online shopping data, and the commodity information; and sending augmented reality (AR) display information of the recommended commodity to a smart terminal of the user, so that the smart terminal displays the recommended commodity to the user in an AR mode.

18 Claims, 7 Drawing Sheets

(51) Int. Cl.
*G06K 9/00* (2006.01)
*G06Q 30/02* (2012.01)
*G06Q 30/06* (2012.01)

(52) U.S. Cl.
CPC ......... *G06Q 30/02* (2013.01); *G06Q 30/0633* (2013.01); *G06Q 30/0643* (2013.01)

(56) References Cited

U.S. PATENT DOCUMENTS

| | | | |
|---|---|---|---|
| 10,445,807 B1* | 10/2019 | Commons | G06Q 30/0623 |
| 10,538,190 B1* | 1/2020 | Metellus | G08G 9/00 |
| 2003/0095689 A1* | 5/2003 | Vollkommer | G06K 9/00 382/117 |
| 2006/0210119 A1* | 9/2006 | Willis | G06K 9/6277 382/115 |
| 2009/0157472 A1* | 6/2009 | Burazin | G06Q 30/02 705/14.57 |
| 2011/0106624 A1* | 5/2011 | Bonner | G06Q 30/0261 705/14.58 |
| 2012/0233003 A1* | 9/2012 | Caiman | G06Q 30/06 705/16 |
| 2013/0346204 A1* | 12/2013 | Wissner-Gross | G06Q 30/0281 705/14.58 |
| 2014/0214600 A1* | 7/2014 | Argue | G06Q 30/0639 705/26.8 |
| 2014/0222603 A1* | 8/2014 | Hay | G06Q 20/18 705/23 |
| 2015/0019373 A1* | 1/2015 | Carbonell | G06Q 30/0631 705/26.7 |
| 2015/0073907 A1* | 3/2015 | Purves | G06Q 20/32 705/14.58 |
| 2017/0039613 A1* | 2/2017 | Kaehler | G02B 27/0172 |

FOREIGN PATENT DOCUMENTS

| | | | |
|---|---|---|---|
| CN | 105095987 | * | 11/2015 |
| CN | 106408365 A | | 2/2017 |
| CN | 106600325 A | | 4/2017 |

OTHER PUBLICATIONS

International Search Report in International Application No. PCT/CN2018/094782, dated Sep. 25, 2020.
Written Opinion in Singapore Application No. 11201910099Q, dated Oct. 27, 2020.

* cited by examiner

400

┌─────────────────────────────────────────────────────────────┐
│ A shopping guide server obtains historical offline shopping │── 401
│ data and historical online shopping data of a user          │
│ according to a user ID, and obtains commodity information   │
│ of a shopping venue according to a scene ID                 │
└─────────────────────────────────────────────────────────────┘
                              │
                              ▼
┌─────────────────────────────────────────────────────────────┐
│ The shopping guide server obtains a commodity to be         │── 403
│ recommended to the user according to the historical offline │
│ shopping data, the historical online shopping data, and     │
│ commodity information of the shopping venue                 │
└─────────────────────────────────────────────────────────────┘
                              │
                              ▼
┌─────────────────────────────────────────────────────────────┐
│ Send AR display information of the recommended commodity to │── 405
│ a smart terminal of the shopping user, so that the smart    │
│ terminal displays the recommended commodity in an AR mode   │
└─────────────────────────────────────────────────────────────┘

*FIG. 4*

OFFLINE SHOPPING GUIDE METHOD AND APPARATUS

CROSS-REFERENCE TO RELATED APPLICATION

This application is a continuation application of International Application No. PCT/CN2018/094782, filed on Jul. 6, 2018, which is based upon and claims priority to Chinese Application No. 201710552347.0, filed on Jul. 7, 2017, both of which are incorporated herein by reference in their entireties.

TECHNICAL FIELD

The present disclosure generally relates to the field of network technologies, and in particular, to offline shopping guide methods and apparatuses.

TECHNICAL BACKGROUND

In online shopping scenarios, shopping recommendations can be generated according to the preferences of the user, as well as online purchasing and browsing behaviors of the user and other data. Making personalized recommendations can help increase the purchase conversion rate. In offline shopping scenarios, the recommended shopping-guide commodities to be viewed by different users are generally the same. By taking a scenario where users go to a shopping mall as an example, the shopping mall can place some shopping-guide advertisements in the stores to guide the customers who enter the shopping mall to purchase the recommended commodities.

SUMMARY

In view of the above, embodiments of the specification provide offline shopping guide methods and apparatuses to provide personalized offline shopping guide recommendations for different users.

In one aspect, an offline shopping guide method includes: obtaining a user identifier (ID) of a user and a scene ID of the shopping venue where the user is located; obtaining historical offline shopping data and historical online shopping data of the user according to the user ID, and obtaining commodity information of the shopping venue according to the scene ID; obtaining a commodity to be recommended to the user according to the historical offline shopping data, the historical online shopping data, and the commodity information, the recommended commodity being a commodity in the shopping venue; and sending augmented reality (AR) display information of the recommended commodity to a smart terminal of the user.

In another aspect, an offline shopping guide apparatus includes: an ID obtaining module configured to obtain a user ID of a user and a scene ID of the shopping venue where the user is located; a data obtaining module configured to obtain historical offline shopping data and historical online shopping data of the user according to the user ID, and obtain commodity information of the shopping venue according to the scene ID; a recommendation processing module configured to obtain a commodity to be recommended to the user according to the historical offline shopping data, the historical online shopping data, and the commodity information, the recommended commodity being a commodity in the shopping venue; and a display processing module configured to send AR display information of the recommended commodity to a smart terminal of the user, so that the smart terminal displays the recommended commodity in an AR mode.

In yet another aspect, an electronic device includes: a memory storing instructions; and at least one processor configured to execute the instructions to: obtain a user ID of a user and a scene ID of the shopping venue where the user is located; obtain historical offline shopping data and historical online shopping data of the user according to the user ID, and obtain commodity information of the shopping venue according to the scene ID; obtain a commodity to be recommended to the user according to the historical offline shopping data, the historical online shopping data, and the commodity information, the recommended commodity being a commodity in the shopping venue; and send AR display information of the recommended commodity to a smart terminal of the user.

In still another aspect, an offline shopping guide system includes: a shopping venue registration device configured to send a registration parameter to a shopping guide server when a user enters the shopping venue; the shopping guide server configured to obtain a user ID of the user and a scene ID of the shopping venue according to the registration parameter, obtain a commodity to be recommended to the user according to historical offline shopping data and historical online shopping data of the user as well as commodity information of the shopping venue, and send AR display information of the recommended commodity to a smart terminal of the user; and the smart terminal configured to display, according to the AR display information sent by the server, the commodity information and shelf information of the recommended commodity in an AR mode.

With the offline shopping guide methods and apparatuses provided by the embodiments of the specification, commodity recommendations can be more accurate and more targeted. The recommendations can be generated by combining the online and offline user shopping data of the user. Different commodities are recommended to different users, and thus the shopping guides are different and more personalized. Moreover, the recommended commodities can be displayed to the users in an AR shopping guide display mode. Accordingly, a personalized offline shopping guide mode for different users can be implemented.

BRIEF DESCRIPTION OF THE DRAWINGS

The accompanying drawings described herein are provided for further comprehension of the specification and constitute a part of the present application. The embodiments of the specification and the description thereof are used for illustration purposes. They do not constitute any improper limitation on the scope of the specification.

FIG. 4 is a flowchart of a commodity recommendation method according to one embodiment of the specification.

DETAILED DESCRIPTION

To facilitate understanding of the technical solutions provided by the specification, the technical solutions in embodiments of the specification will be described in detail below with reference to the accompanying drawings. It is appreciated that the described embodiments are exemplary, rather than all the embodiments. All other embodiments obtained by a person of ordinary skill in the art based on the embodiments of the specification shall all fall within the protection scope of the present disclosure.

In offline shopping scenarios, recommended shopping guides viewed by different users are generally the same. Taking a shopping mall as an example, the shopping-guide commodities in the shopping mall seen by different users entering the shopping mall can be the same. For example, all the recommendations refer to the same recommended commodities arranged in the shopping mall. However, different users may have different purchase interests. Some people are more interested in food items and the purchase desire is higher with respect to food, and some people are more interested in electrical appliances. Therefore, if the shopping guide provides personalized recommended commodities for different users, it can help increase the purchase conversion rates and improve the offline shopping experience.

Figure 1:
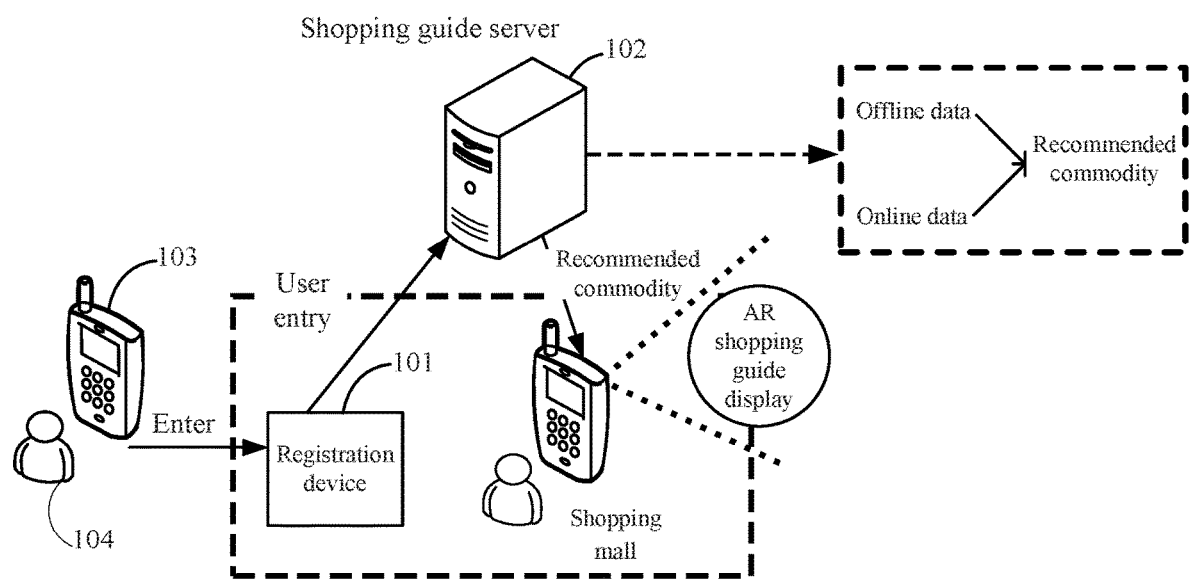
FIG. 1 is a schematic diagram of an offline shopping guide system according to one embodiment of the specification.

FIG. 1 illustrates a diagram of an offline shopping guide system 100, according to an embodiment. The offline shopping guide system 100 can be applied to any shopping venue. In the embodiment illustrated in FIG. 1, the shopping venue is exemplified by a shopping mall. The system 100 can be deployed in the shopping mall. In some embodiments, the shopping venue may also be other venues such as a convenience store. As shown in FIG. 1, the offline shopping guide system 100 includes a registration device 101 disposed in the vicinity of the entrance of the shopping mall, a shopping guide server 102, and a smart terminal 103 associated with a user 104.

The registration device 101 can be used to register the entry of a user into the shopping mall. For example, when the user 104 enters the shopping mall, the registration device 101 can notify the shopping guide server 102, so that the shopping guide server 102 can recommend a shopping-guide commodity to the user 104. In one embodiment, the registration device 101 can be a code scanning device disposed at an entrance access control point of the shopping mall, and the user 104 scans a code when entering the shopping mall. In one embodiment, the registration device 101 can also be disposed on a commodity container (for example, a shopping cart, or a shopping basket) associated with the shopping mall. When the user 104 holds the commodity container in the shopping mall, the user 104 can register his or her entrance into the shopping mall through the registration device 101 on the container. In some embodiments, the registration device 101 can also be disposed on a commodity shelf (for example, a digital shelf in the shopping mall).

The smart terminal 103 may be a user's (such as the user 104 in FIG. 1) smart phone, augmented reality (AR) glasses, or a display device mounted on the commodity container, e.g., a display device mounted on the shopping cart. The smart terminal 103 includes a device capable of AR display. After receiving a registration notification of the registration device 101 which indicates the entry of the user 104 to the shopping mall, the shopping guide server 102 can send relevant information of the recommended shopping-guide commodity to the smart terminal 103. The smart terminal 103 can provide an AR shopping guide service for the user.

AR technology can calculate locations and angles of camera images in real time and add corresponding images, videos, and 3D models. One goal of AR technology is to put the virtual world in the real world and enable interactions on the screen. For example, with the AR shopping guide, a commodity in the shopping mall can be obtained by a camera for identification, and can be combined with a virtual object generated by the computer. For example, the commodity introduction, and price and discount information of the commodity can be virtualized and combined with a real commodity obtained by the camera. The user (such as the user 104 in FIG. 1) can see the real shopping mall scene collected by the camera, and can also see related information such as the commodity price superimposed on the real commodity displayed in the virtual mode. The AR shopping guide can display the effects and information that may not be achieved in the actual environment, and can interact with the user through the screen. That way, the commodities can be better displayed, which helps the user to choose commodities during shopping.

The offline shopping guide system 100 shown in FIG. 1 can obtain information associated with the user 104 who enters the shopping mall through the registration device 101. The shopping guide server 102 can obtain personalized shopping-guide commodities to be recommended to the user 104. Moreover, through the AR shopping guide display on the smart terminal 103, a personalized shopping guide for different users in the offline shopping scene can be generated.

For example, after a user A enters the shopping mall, the shopping guide server 102 can obtain the shopping-guide commodities a1 and a2 recommended to the user A, and send the related commodity information to the smart terminal 103 of the user A for AR display. When a user B enters the shopping mall, the shopping guide server 102 can obtain the shopping-guide commodity b1 recommended to the user B, and perform AR display on the smart terminal 103 of the user B.

Still referring to FIG. 1, in some embodiments, the user 104 can scan the code at the entrance of the shopping mall with his/her smart phone 103, the shopping guide server 102 can send the shopping-guide commodity to the user's smart phone 103 for providing the AR shopping guide service. The user 104 can enable a camera of the smart phone 103 in the process of choosing commodities. In some embodiments, the user 104 can also register entrance into the shopping mall through a display device mounted on a shopping cart. The shopping guide server 102 can send the recommended commodity information to a display device on the shopping cart used by the user 104. The user 104 can watch the AR shopping guide display on the display device while pushing the shopping cart around to choose commodities, so that user does not have to take out the smart phone.

Implementation of the offline shopping guide system 100 illustrated in FIG. 1 according to one embodiment is further described below.

The registration device 101 registers the entry of the user 104 to the shopping mall, so that the shopping guide server 102 knows the current shopping mall and the user 104 to generate shopping recommendations for the user 104 in the shopping mall. To improve the speed of obtaining user and shopping mall information, a biological identification method can be used to register the biological information of the user 104 when the user 104 enters the shopping mall for the first time. Subsequent entry of the same user can be directly identified based on the biological information of the user 104.

Figure 2:
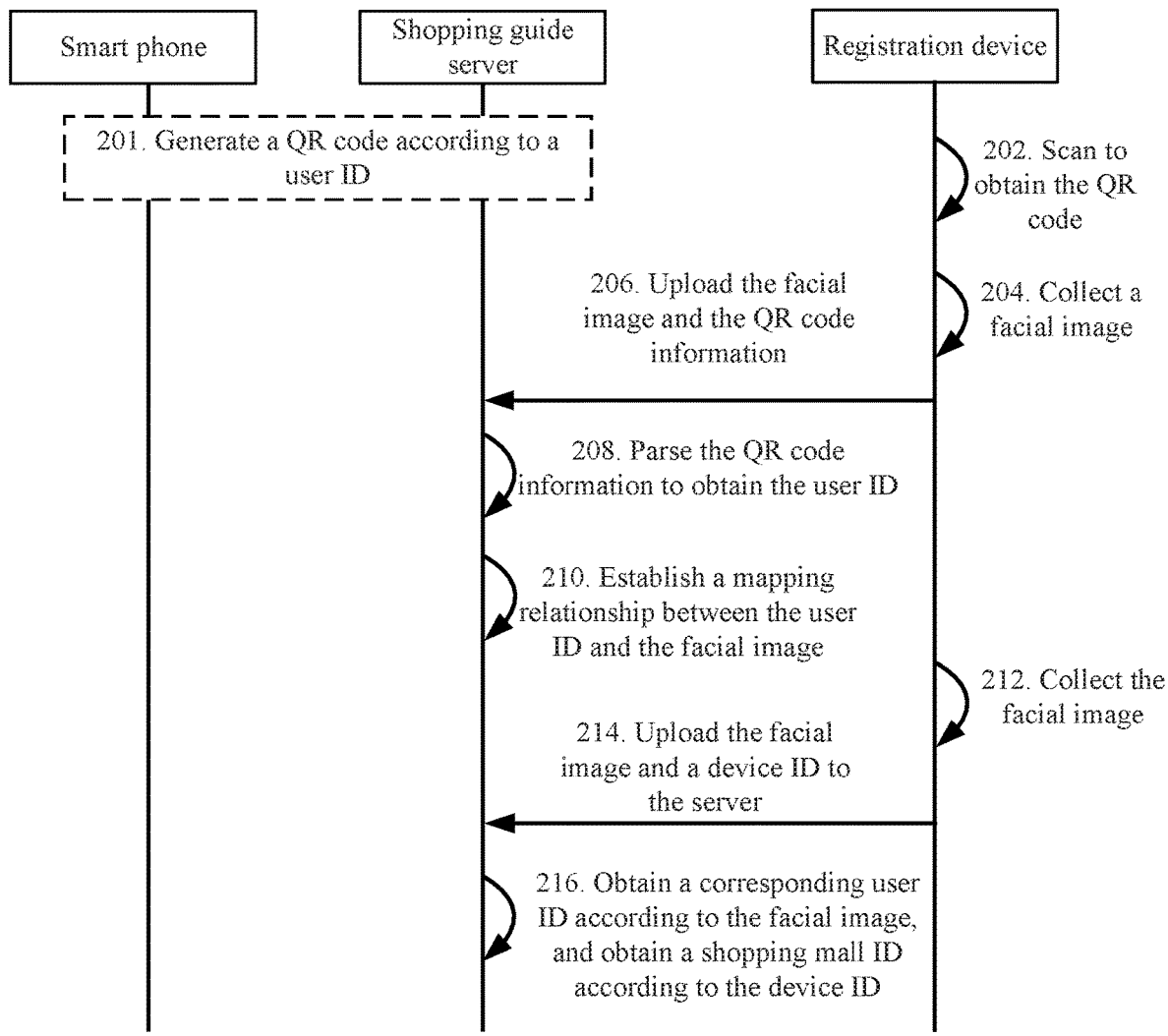
FIG. 2 is a process diagram of obtaining a scene ID and a user ID according to one embodiment of the specification.

Taking facial recognition as an example, FIG. 2 is a process diagram of obtaining a scene ID and a user ID, which illustrates an interaction process 200 between a smart phone of a user, a registration device, and a shopping guide server, according to an embodiment.

In step 201, an application (APP) on a smart phone of a user triggers the generation of a QR code.

For example, when the user enters the shopping mall for the first time, the smart phone is turned on, and the generation of a QR code can be triggered by the APP. The APP can be a shopping guide client, relative to the shopping guide server, installed on the smart phone. For example, the option "Enable AR shopping guide" on the APP can be clicked, and the shopping guide server is triggered to generate the QR code information by using an encryption algorithm according to information of the user (for example, the user ID).

In some embodiments, the APP can generate the QR code according to the user ID. Alternatively, the shopping guide server can generate a QR code upon being triggered by the APP, and then send the QR code to the APP for display.

In step 202, a registration device obtains the QR code information on the smart phone of the user. For example, the user can present the QR code to the registration device for scanning, and the registration device can obtain the QR code information.

In step 204, the registration device collects a facial image of the user through a camera.

In step 206, the registration device uploads the facial image and the QR code information to a shopping guide server.

In step 208, the shopping guide server parses the QR code information to obtain a user ID.

In step 210, the shopping guide server establishes a mapping relationship between the user's facial image and the user ID.

Through steps 201-210, the shopping guide server stores a mapping relationship between the user's biological information and the user ID. In some embodiments, the user's biological information may be other information such as voiceprint, fingerprint, and palm print. In addition, the shopping guide server can further store a mapping relationship between the device ID of the registration device and the shopping mall ID. The mapping relationship may be stored on the shopping guide server when the shopping mall installs the registration device.

In some embodiments, when transmitting the QR code information and facial image of the user to the shopping guide server, the registration device can transmit the device ID to the shopping guide server, and the server can obtain the shopping mall ID corresponding to the device ID. That way, the server can obtain information about the shopping mall which the user enters. In some embodiments, the shopping guide server can also establish a mapping relationship between the shopping mall ID and the user's facial image, and store user information associated with the same shopping mall in a same image library. That way, after the ID of the shopping mall which the user enters is obtained subsequently, the facial image can be searched and matched in the image library corresponding to the shopping mall, to quickly determine the user entering the shopping mall.

Steps 212-216 in FIG. 2 illustrate the process of obtaining the user ID and the shopping mall ID when the user enters the shopping mall subsequently.

In step 212, the registration device collects the facial image of the user through the camera.

In step 214, the registration device uploads the facial image and its device ID to the shopping guide server.

In step 216, the shopping guide server obtains a corresponding user ID according to the facial image, and a shopping mall ID according to the device ID. The shopping mall ID can be the scene ID of the shopping mall. Similarly, if the shopping venue is a convenience store, the scene ID may be the ID of the convenience store. The shopping guide server can conduct matching according to the facial image to obtain a corresponding user ID, thereby identifying the shopping scene and the user.

Figure 3:
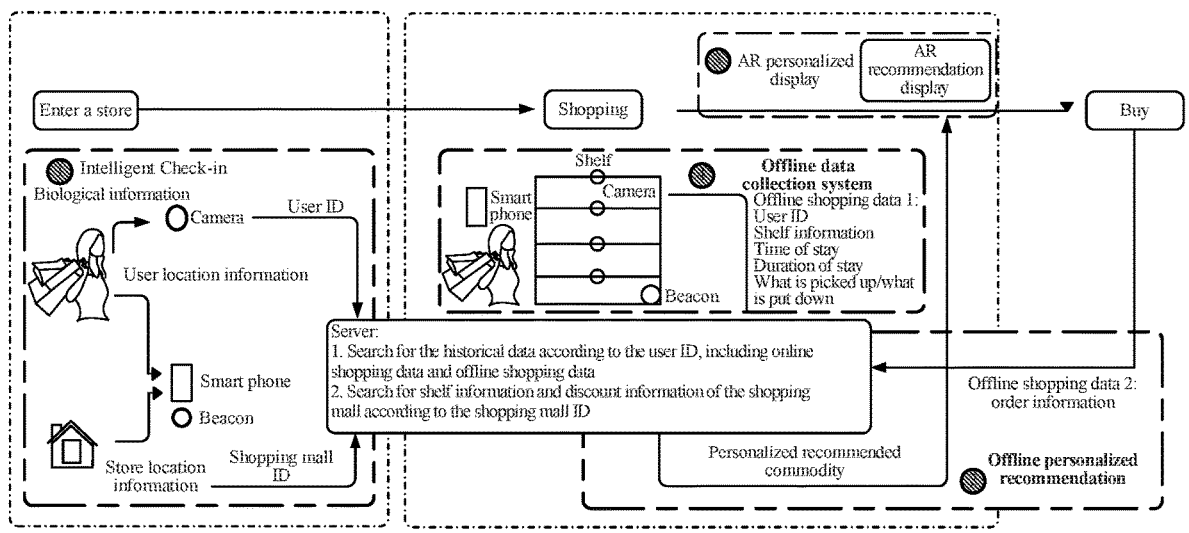
FIG. 3 is a schematic diagram of a shopping process in a shopping mall according to one embodiment of the specification.

FIG. 3 is a schematic diagram of a shopping process 300 of a user in a shopping mall according to one embodiment. As shown in FIG. 3, a user can enter a shopping mall through an intelligent check-in system. The intelligent check-in system may include the user's smart phone, the registration device, etc. Through the intelligent check-in system, the shopping guide server can quickly obtain information about the user and shopping mall.

After the user enters the shopping mall, the shopping guide server starts to recommend commodities to the user, and the AR shopping guide can be displayed to the user through a smart terminal. For example, the smart terminal can be the user's smart phone, and the AR shopping guide can be displayed on the smart phone.

FIG. 4 is a flow chart of a commodity recommendation method 400 according to one embodiment. The commodity recommendation method 400 can be implemented by the shopping guide server. As shown in FIG. 4, the commodity recommendation method 400 includes the following steps.

In step 401, the shopping guide server obtains historical offline shopping data and historical online shopping data of a user according to a user ID, and obtains commodity information of a shopping venue according to a scene ID.

In some embodiments, the shopping guide server can store the historical offline shopping data and the historical online shopping data corresponding to the user. For example, the historical offline shopping data may include data such as one or more shopping venues where the user has shopped, commodity names, commodity categories, commodity prices, shopping time, and discounts, etc. The historical online shopping data may include information of one or more websites where the user has shopped, commodity names, commodity categories, commodity prices, shopping time, discounts and deals, and logistics and delivery information, etc.

After identifying the user ID according to the user biological information transmitted by the registration device, the shopping guide server can obtain the stored historical offline shopping data and historical online shopping data of the user according to the user ID. Moreover, the shopping guide server can also obtain the corresponding scene ID according to the device ID of the registration device, and obtain the stored commodity information of the shopping venue according to the scene ID. The commodity information may include, for example, the name and location of the shopping venue, commodities for sale in the shopping mall, current commodity discounts and deals information, and shelf locations of the commodities in the shopping venue. In addition, the shopping guide server can also obtain other data such as the current time.

In step 403, the shopping guide server obtains a commodity to be recommended to the user according to the historical offline shopping data, the historical online shopping data, and the commodity information of the shopping venue.

In this step, the shopping guide server can determine the recommended commodity by using a recommendation algorithm. For example, the recommendation algorithm may be a collaborative filtering algorithm, a user-based recommendation algorithm, an item-based recommendation algorithm, and a decision tree algorithm, etc.

In the determination process of recommended commodity, the historical offline shopping data and the historical online shopping data of the user can reflect the user's shopping interests and preferences. For example, the user may prefer to buy tableware or prefer to buy sausages, then the commodity category that the user is interested in can be recommended to the user. Further, which brands of commodities the user prefers can also be obtained according to the historical data. For example, if the user frequently purchases a certain brand of milk or cooked food, the commodity of the user's favorite brand can be recommended to the user during the recommendation process. The commodity information of the shopping venue can be used to assist in obtaining which commodities can be recommended to the user. The commodity that the user is interested in can be a commodity that the shopping mall offers, and can be selected from commodities that the shopping venue is currently selling.

In this step, the commodity recommended to the user by the shopping guide server may include the commodity name, the commodity introduction, the commodity price, the commodity price discounts, and the shelf location of the recommended commodity in the shopping venue. Information of the recommended commodities can be provided to the user in the subsequent AR display.

In some embodiments, the historical online shopping data used in the determination as described above may be previous online shopping data of the user collected and obtained by the shopping guide server. The historical offline shopping data may be obtained by the offline shopping guide system, which may include an offline data collection device for collecting offline data associated with the user. Detailed implementation and data collection process of the offline data collection device is further described below.

In step 405, AR display information of the recommended commodity is sent to a smart terminal of the user, so that the smart terminal displays the recommended commodity in an AR mode.

The personalized shopping guide commodity recommendation generated by the shopping guide server for different users can be sent to smart terminals of the respective users for AR display. The smart terminal can be a display device on the shopping cart, AR glasses, etc. For example, the smart terminal can be the smart phone of the user. A shopping guide client APP corresponding to the shopping guide server can be installed on the smart phone of the user. To display the recommended commodity on the smart phone in an AR mode, the shopping guide server can send the AR display information of the recommended commodity to the smart phone. The AR display information may include information such as information for displaying a virtual environment indicating the shelf location of the recommended commodity, and the price and discounts of the recommended commodity. That is, the smart terminal can display the commodity information of the recommended commodity and the shelf where the commodity is located in an AR mode.

As an example, with reference to the schematic diagram of FIG. 3, after receiving the user ID and the shopping mall ID obtained by the intelligent check-in system, the shopping guide server may search for the historical shopping data of the user according to the user ID, and obtain the current shelf location information, commodity discounts and deals information, etc. of the shopping mall according to the shopping mall ID. The shopping guide server can then obtain the personalized recommended commodity for the user according to the foregoing information, and transmit the personalized recommended commodity to the smart terminal for AR recommendation display.

AR display of the recommended commodity can be implemented in the following manners.

In some embodiments, when the user enables the camera of the smart phone, the recommended commodities within the range inside the shopping mall that can be captured by the camera are displayed in an AR mode. Recommended commodities outside the range that can be captured by the camera may not be displayed in an AR mode.

For example, the shopping guide client on the smart phone of the user can transmit the real photographing scenes captured by the camera of the smart phone of the user to the shopping guide server. The shopping guide server can determine one or more recommended commodities on the shelves within the captured scenes. For example, if the capture scenes include shelf S1 and shelf S2 of the shopping mall, it can be determined whether the recommended commodities obtained by the recommendation algorithm include commodities located on the two shelves. If the recommended commodities are located on the two shelves, data such as the content introduction, price discounts, and shelf locations of the commodities can be sent to the smart phone of the user. The smart phone of the user can superimpose the commodity information such as the content introduction and the price discounts of the commodities onto the corresponding commodities on the shelves in the captured scenes to form the AR display.

Such an AR display mode allows the user to quickly find out whether there are recommended commodities of interest on the shelves the user is currently browsing in the shopping mall. Through the AR mode display, the user can further visually see the locations of the commodities on the shelf. It does not require the user to search for the commodities. The user can efficiently locate the commodities.

In some embodiments, in addition to the recommended commodities in the real scenes captured by the smart phone, the recommended commodities on commodity shelves outside the captured scenes can also be sent to the smart phone for display. For example, the shopping guide server can determine all or some of the recommended commodities, including commodities within and outside the real scenes that can be captured by the camera. During the display process on the smart phone, a virtual scene map of the shopping mall can be displayed, including the shelves in the shopping mall. The recommended commodities can be displayed on the corresponding shelf locations.

After the user selects a recommended commodity, the shopping guide server can send the image feature data and the AR navigation information of the commodity to the smart phone of the user according to the selection. The image feature data may be a photo of the commodity, and the AR navigation information may be a navigation path obtained by the shopping guide server according to the current location of the user and the shelf location of the selected commodity. The navigation path information can be sent to the smart phone of the user. The current location of the user can be positioned by a positioning device installed on the shelf in the shopping mall, and the positioning mode can be Near Field Communication (NFC), such as WiFi, WiMax, ZigBee, Adhoc, BlueTooth, Beacon, RFID, and UWB.

The smart phone of the user can perform AR path navigation according to the AR navigation information fed back by the shopping guide server, to guide the user to go to the shelf location of the selected commodity. Moreover, in the navigation process, the camera of the smart phone of the user can capture the real scene, and match the commodity image in the real scene with the image feature data of the commodity returned by the navigation server. If the matching is successful, it is indicated that the recommended commodity is found. The smart phone can also combine the information of the commodity such as the price and introduction with the commodity in the real photographing scene to perform the AR display.

The above-described AR display mode can enable the user to quickly determine the shelf locations in the shopping mall where the recommended commodities are distributed, and to quickly and accurately find the recommended commodities according to the navigation path. The solutions provided herein can therefore not only greatly facilitate searching and locating the commodities, thereby improving the shopping speed and the shopping experience, but also improve the purchase conversion rates of offline shopping and provide better shopping guidance.

As mentioned above, the offline shopping data associated with the user is used for the acquisition of recommended commodities. With reference to FIG. 3, the offline shopping guide system can be further provided with an offline data collection device. As shown in FIG. 3, a camera and an NFC positioning device such as Beacon and BlueTooth can be installed on the shelves in the shopping mall. These devices can be in near-field communication with the smart phone of the user to locate the user. Thus, the shelves in the shopping mall form an indoor positioning system for indoor positioning of the user.

Figure 5:
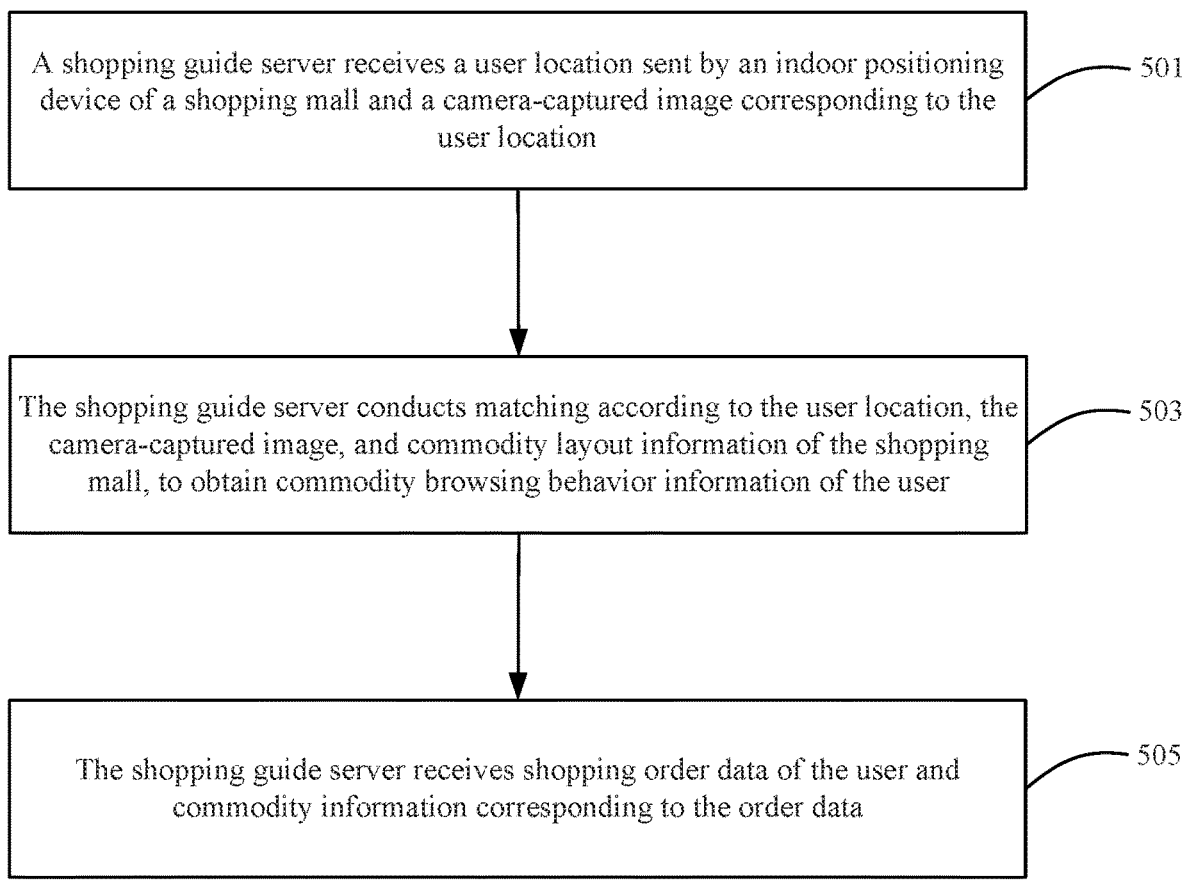
FIG. 5 is a flowchart of obtaining offline data according to one embodiment of the specification.

FIG. 5 illustrates a process 500 in which the shopping guide server obtains the offline shopping data of the user, according to an embodiment. As shown in FIG. 5, the process 500 can include the following steps.

In step 501, a shopping guide server receives a user location sent by the indoor positioning device of a shopping mall and a camera-captured image corresponding to the user location.

In step 503, the shopping guide server conducts matching according to the user location, the camera-captured image, and commodity layout information of the shopping mall to obtain commodity browsing behavior information of the user.

According to some embodiments, in steps 501 and 503, the smart phone of the user and the Beacon on the shelves can perform communication positioning to obtain the indoor location of the user in the shopping mall (namely, the shopping venue). Based on a distance matching algorithm and the location information of the shelves in the shopping mall, it can be determined which shelf corresponds to the location where the user is currently staying at and the duration of the user's stay. The above information can further be combined with image recognition based on images collected by the shelf camera, to determine what operations the user has done on the commodities on that shelf, such as which commodities are picked up and which commodities are put down. The shelf locations and commodity layout on the shelves, etc. can be used as the commodity layout information of the shopping mall.

In the shopping process of the user, for example, the location information of the user can be reported to the shopping guide server through the smart phone of the user at a certain time interval. The shopping guide server combines data such as the shelf locations and the commodities on the shelves in the shopping mall to determine which shelf the user is located at and which commodities the user operates. When the user location is reported to the shopping guide server, the shopping guide server can also record the time of receiving the report, and can obtain the browsing path of the user in the shopping mall using a timing analysis method. Accordingly, the commodity browsing behavior information of the user in the shopping process can be obtained. The commodity browsing behavior information can include the user ID (which can be identified by the reporting terminal/mobile client), places where the user has stayed, the time and duration of the stays, and which commodities are operated in sequence.

In step 505, the shopping guide server receives shopping order data of the user at the shopping venue and commodity information corresponding to the order data.

After the user makes a payment, the user purchase order can also be uploaded to the server through the smart phone of the user or a cash register of the shopping mall. The corresponding commodity information in this step may be the shelf locations, discounts, and deals, etc. of the commodities in the order. The shopping guide server can store the commodity browsing behavior information, the shopping order data, and the corresponding commodity information as historical offline shopping data of the user at the shopping mall.

Based on the above, the offline shopping guide methods according to some embodiments combine the online and offline user shopping data, so that the recommended commodities are more accurate and more targeted. Different commodities are recommended to different users, and thus the shopping guides are different. Further, with respect to the implementation of the personalized shopping guide, the AR shopping guide technique is introduced into the offline shopping guide mode. Personalized data is sent to and displayed through the smart terminals of different users. Moreover, other advantages of the AR shopping guide include the display of the shelves where the commodities are located, and the function of path navigation to the shelves where the commodities are located. Therefore, shopping experience can be improved, and users can also quickly and conveniently find the commodities.

It is appreciated that the execution sequence of different steps described in the foregoing process is not limited to the sequence shown in the accompanying flowcharts. In addition, the different steps described above may be implemented in the form of software, hardware, or a combination thereof. For example, the solutions described above can be implemented in the form of software, which can be a set of computer executable instructions capable of implementing the corresponding logic functions. Further, when the solutions are implemented in the form of software, the executable instructions can be stored in a memory and can be executed by a processor in a device.

In some embodiments, data processing devices are provided. For example, the data processing device can be a shopping guide server, which can perform the method steps described above. The device can include a processor, a memory, and computer instructions stored in the memory and executable by the processor. In an embodiment, the processor executes the instructions to implement the following steps: obtaining a user ID of a user and a scene ID of a shopping venue where the user is located; obtaining historical offline shopping data and historical online shopping data of the user according to the user ID, and obtaining commodity information of the shopping venue according to the scene ID; obtaining a commodity to be recommended to the user according to the historical offline shopping data, the historical online shopping data, and the commodity information, the recommended commodity being a commodity in the shopping venue; and sending AR display information of the recommended commodity to a smart terminal of the user, so that the smart terminal displays the recommended commodity in an AR mode.

According to some embodiments, offline shopping guide apparatuses are provided. The offline shopping guide apparatus can be located in a shopping guide server.

Figure 6:
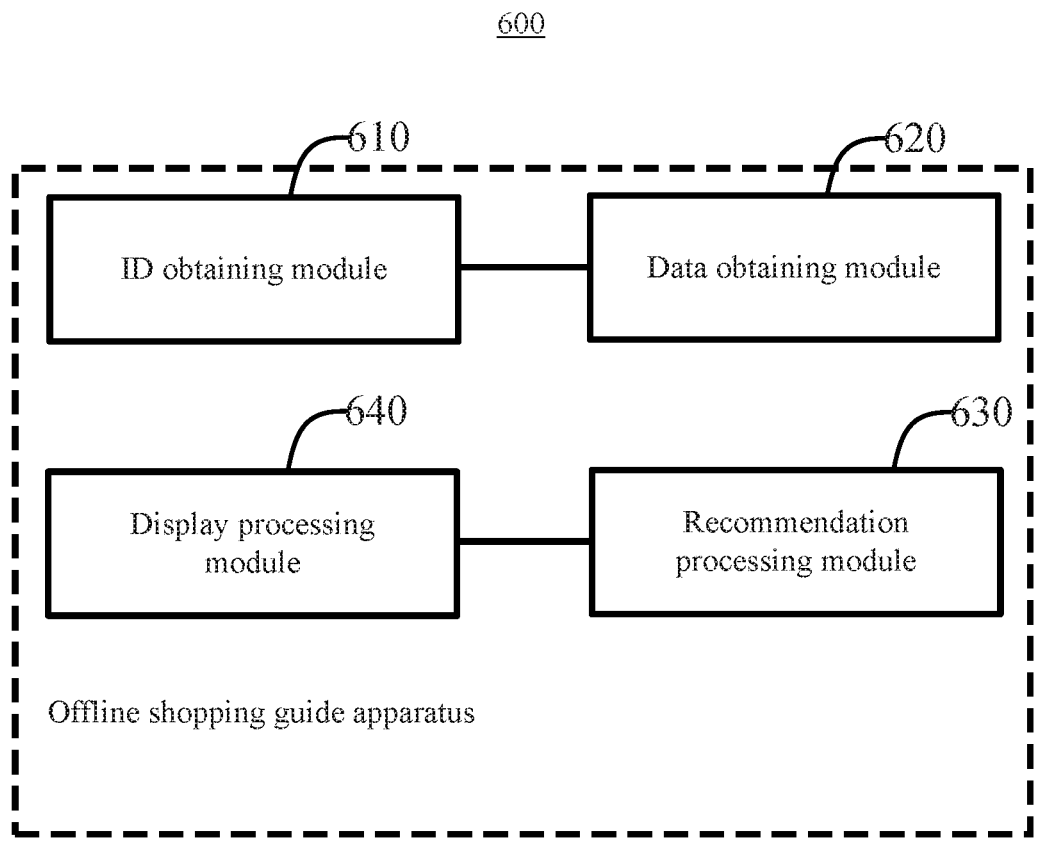
FIG. 6 is a schematic diagram of an offline shopping guide apparatus according to one embodiment of the specification.

FIG. 6 is a schematic diagram of an offline shopping guide apparatus 600 according to an embodiment. The apparatus 600 includes an ID obtaining module 610, a data obtaining module 620, a recommendation processing module 630, and a display processing module 640.

The ID obtaining module 610 is configured to obtain a user ID of a user and a scene ID of a shopping venue where the user is located.

The data obtaining module 620 is configured to obtain historical offline shopping data and historical online shopping data of the user according to the user ID, and obtain commodity information of the shopping venue according to the scene ID.

The recommendation processing module 630 is configured to obtain a commodity to be recommended to the user according to the historical offline shopping data, the historical online shopping data, and the commodity information, the recommended commodity being a commodity in the shopping venue.

The display processing module 640 is configured to send AR display information of the recommended commodity to a smart terminal of the user, so that the smart terminal displays the recommended commodity in an AR mode.

In one embodiment, the ID obtaining module 610 is configured to: when obtaining a scene ID of the shopping venue, receive a device ID sent by a registration device of the shopping venue, the registration device being configured to register the entry of a user to the shopping venue; and obtain a scene ID of the shopping venue corresponding to the device ID.

In one embodiment, the ID obtaining module 610 is further configured to: before obtaining a user ID of a user, receive biological information and the user ID of the user, the biological information and the user ID being collected by a registration device of the shopping venue; establish a mapping relationship between the biological information and the user ID; and obtain, according to the mapping relationship, the user ID corresponding to the biological information when receiving the biological information of the user collected by the registration device of the shopping venue.

In one embodiment, the data obtaining module 620 is further configured to: receive a user location sent by an indoor positioning device of the shopping venue and a camera-captured image corresponding to the user location; conduct matching according to the user location, the camera-captured image, and commodity layout information of the shopping venue, to obtain commodity browsing behavior information of the user; receive shopping order data of the user at the shopping venue and commodity information corresponding to the order data; and store the commodity browsing behavior information, the shopping order data, and the commodity information corresponding to the order data as historical offline shopping data of the user at the shopping venue.

In one embodiment, the display processing module 640 is configured to: determine, according to a real scene captured by the smart terminal of the user, a recommended commodity on a commodity shelf in the real scene; and send AR display information of the recommended commodity to the smart terminal of the user, the AR display information including the commodity shelf location and commodity information of the recommended commodity.

Figure 7:
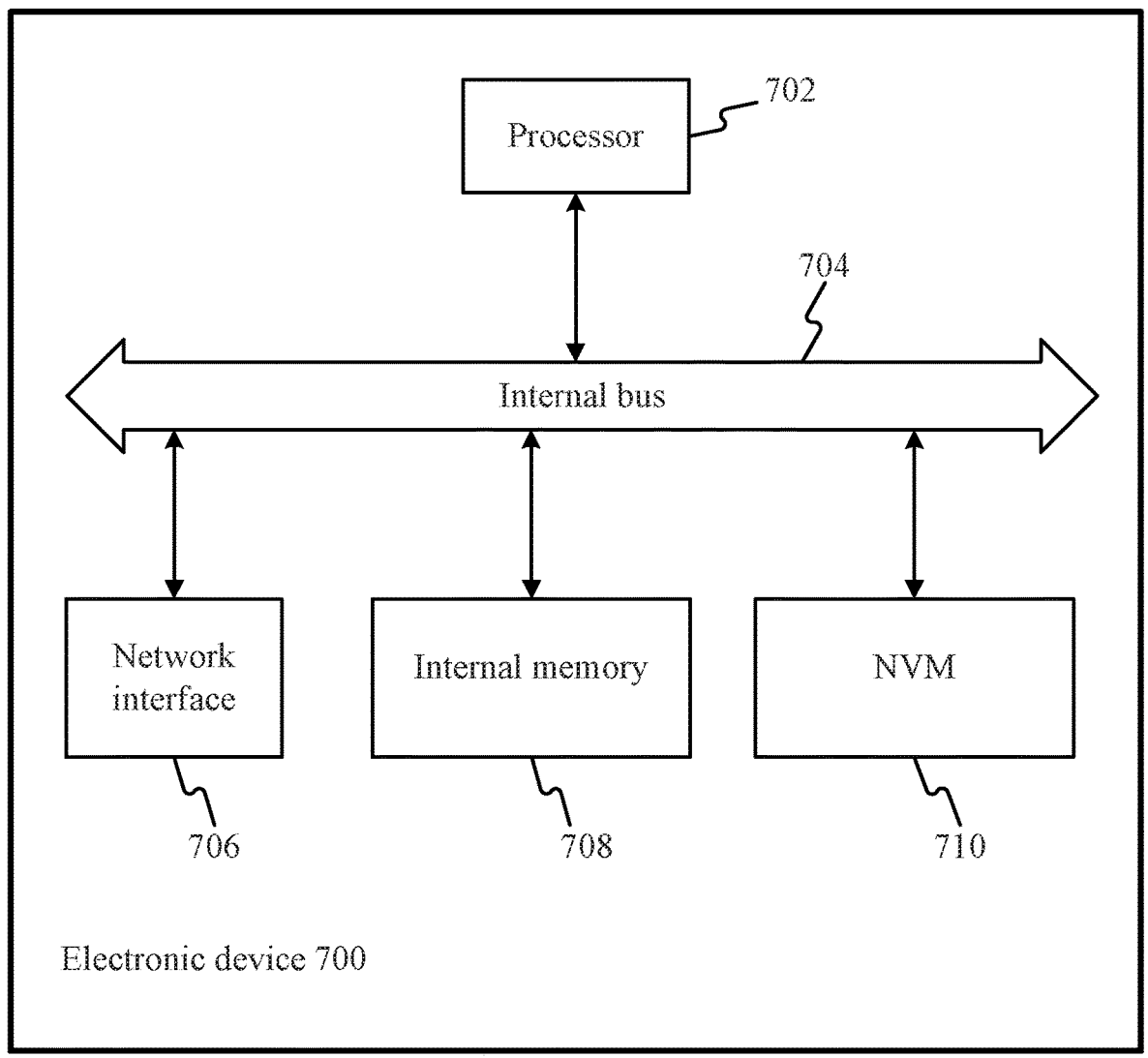
FIG. 7 is a schematic diagram of an electronic device according to one embodiment of the specification.

FIG. 7 is a schematic diagram of an electronic device 700 according to an embodiment. For example, the device 700 may be any of the shopping guide servers or offline shopping guide apparatuses described above. Referring to FIG. 7, the device 700 includes a processor 702, an internal bus 704, a network interface 706, and a memory such as an internal memory 708 and a nonvolatile memory (NVM) 710. The processor 702 is configured to execute instructions stored in the memory for performing the above described methods.

The apparatuses or modules illustrated in the foregoing embodiments may be implemented by computer chips or components or implemented by a product having a certain function. For example, the implementation device can be a computer device, such as a personal computer, a laptop computer, a cellular phone, a camera phone, a smart phone, a personal digital assistant, a media player, a navigation device, an email transceiver, a game console, a tablet computer, a wearable device, or any combination of these devices.

For the convenience of description, the devices described above are divided into various modules according to the functions performed. It is appreciated that the functions of various modules can be implemented in one or more pieces of software and/or hardware when implementing one or more embodiments of the specification.

In the embodiments, a payment technology carrier involved in the payment of the shopping order by the user may include NFC, WIFI, 3G/4G/5G, POS card swipe technology, QR code scanning technology, barcode scanning technology, Bluetooth, infrared, Short Message Service (SMS), Multimedia Message Service (MMS), etc.

The biological features involved in the biological identification described above may include, for example, eye features, voiceprints, fingerprints, palm prints, heartbeats, pulses, chromosomes, DNA, human bite marks, etc. The eye features may include biological features such as iris and sclera.

It is appreciated that the embodiments of the specification can be provided as methods, devices, or computer program products. For example, one or more embodiments of the specification can be implemented in the form of a hardware embodiment, a software embodiment, or an embodiment combining software and hardware. Moreover, the embodiments of the specification can be in the form of a computer program product implemented using one or more computer usable storage media (including, but not limited to, a disk memory, a CD-ROM, an optical memory, etc.) having computer usable program codes stored therein.

For example, program code can be stored in a storage medium, which includes a set of instructions for instructing a computer device (which may be a personal computer, a server, a network device, a mobile device, or the like) or a processor to perform a part of the steps of the methods described above. The foregoing storage medium may include, for example, any medium that can store a program code, such as a USB flash disk, a removable hard disk, a Read-Only Memory (ROM), a Random Access Memory (RAM), a magnetic disk, or an optical disc. The storage medium can be a non-transitory computer-readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

In addition, embodiments of the specification can be implemented through computer executable instructions executed by a computer, for example, using program modules. The program modules can include routines, programs, objects, components, data structures, etc. that execute particular tasks or implement particular abstract data types. Embodiments of the specification can also be practiced in distributed computing environments where tasks are executed by remote processing devices that are connected through a communication network. In the distributed computing environments, the program modules can be located in both local and remote computer storage media including storage devices.

In the embodiments of the specification described above, the same or similar portions of various embodiments may correspond to each other. Each embodiment may focus on differences from other embodiments. For example, the offline navigation apparatus or data processing device embodiments may perform steps similar to those described in the method embodiments. Description of certain parts of the device embodiments may be relatively simple, and reference can be made to the corresponding description of the method embodiments.

Exemplary embodiments of the specification are described above. It is appreciated that the actions or steps described above can be performed in a different order. Similarly, the processes depicted in the drawings do not indicate any particular mandatory order, and some steps may be performed in a different order. In some embodiments, multi-task processing and parallel processing may be applied.

The above description provides exemplary embodiments of the specification and is not intended to limit the specification. Various changes and modifications can be made to the embodiments by those skilled in the art, consistent with the specification. Any modifications, equivalent substitutions, improvements, etc. made consistent with the spirit of the specification shall all fall within the scope defined in the appended claims.

The invention claimed is:

1. An offline shopping guide method, comprising:
obtaining, by a registration device associated with a shopping venue, QR code information from a user;
collecting, by the registration device, biometric information of the user;
receiving the biometric information of the user and the QR code information uploaded by the registration device;
parsing the QR code information to obtain a user identifier (ID);
establishing and storing a mapping relationship between the biometric information of the user and the user ID;
obtaining the user ID of the user based on the mapping relationship between the biometric information and the user ID, and a scene ID of the shopping venue where the user is located;
obtaining historical offline shopping data and historical online shopping data of the user according to the user ID, and obtaining commodity information of the shopping venue according to the scene ID;
obtaining a recommended commodity to the user according to the historical offline shopping data, the historical online shopping data, and the commodity information; and
sending augmented reality (AR) display information of the recommended commodity to a terminal of the user;
wherein when the recommended commodity is outside a current scene captured by the terminal, the sending the AR display information to the terminal comprises:
sending image data and AR navigation information associated with the recommended commodity to the terminal, wherein the AR navigation information is configured to perform navigation, and the image data is configured to locate the recommended commodity within a real scene captured by the terminal by matching images of commodities in the real scene with the image data.

2. The method according to claim 1, wherein the obtaining the scene ID of the shopping venue comprises:
receiving a device ID of the registration device associated with the shopping venue, the registration device being configured to register an entry of the user to the shopping venue; and
obtaining the scene ID of the shopping venue based on the device ID.

3. The method according to claim 2, wherein the registration device is located in at least one of: the vicinity of an entrance of the shopping venue, a commodity container, or a commodity shelf.

4. The method according to claim 1, wherein the obtaining the user ID of the user based on the mapping relationship comprises:
receiving biometric information of the user collected by the registration device associated with the shopping venue; and
obtaining, based on the mapping relationship between the biometric information and the user ID, the user ID corresponding to the received biometric information.

5. The method according to claim 4, wherein the biometric information comprises at least one of: a facial feature, a voiceprint, a fingerprint, or a palm print.

6. The method according to claim 1, further comprising:
receiving user location information sent by a positioning device and an image corresponding to the user location information;
obtaining commodity browsing behavior information of the user based on the user location information, the image corresponding to the user location information, and commodity layout information of the shopping venue;
receiving order data of the user at the shopping venue and commodity information corresponding to the order data; and
storing the commodity browsing behavior information, the order data, and the commodity information corresponding to the order data as the historical offline shopping data of the user.

7. The method according to claim 1, wherein the AR display information comprises a location of a shelf in the shopping venue where the recommended commodity is located and further comprises information of the recommended commodity.

8. The method according to claim 7, wherein the shelf is within the current scene captured by the terminal of the user.

9. The method according to claim 1, wherein the terminal comprises at least one of: a smart phone, AR glasses, or a display device mounted on a commodity container.

10. An electronic device, comprising:
a memory storing instructions; and
at least one processor configured to execute the instructions to:
obtain, by a registration device associated with a shopping venue, QR code information from a user;
collect, by the registration device, biometric information of the user;
receive the biometric information of the user and the QR code information uploaded by the registration device;
parse the QR code information to obtain a user identifier (ID);
establish and store a mapping relationship between the biometric information of the user and the user ID;
obtain the user ID of the user based on the mapping relationship between the biometric information and the user ID, and a scene ID of the shopping venue where the user is located;
obtain historical offline shopping data and historical online shopping data of the user according to the user ID, and obtain commodity information of the shopping venue according to the scene ID;
obtain a recommended commodity to the user according to the historical offline shopping data, the historical online shopping data, and the commodity information; and
send augmented reality (AR) display information of the recommended commodity to a terminal of the user;
wherein when the recommended commodity is outside a current scene captured by the terminal, in sending the AR display information to the terminal, the at least one processor is further configured to execute the instructions to:
send image data and AR navigation information associated with the recommended commodity to the terminal, wherein the AR navigation information is configured to perform navigation, and the image data is configured to locate the recommended commodity within a real scene captured by the terminal by matching images of commodities in the real scene with the image data.

11. The device according to claim 10, wherein in obtaining the scene ID of the shopping venue, the at least one processor is further configured to execute the instructions to:
receive a device ID of the registration device associated with the shopping venue, the registration device being configured to register an entry of the user to the shopping venue; and
obtain the scene ID of the shopping venue based on the device ID.

12. The device according to claim 11, wherein the registration device is located in at least one of: the vicinity of an entrance of the shopping venue, a commodity container, or a commodity shelf.

13. The device according to claim 10, wherein in obtaining the user ID of the user based on the mapping relationship, the at least one processor is further configured to execute the instructions to:
receive biometric information of the user collected by the registration device associated with the shopping venue; and
obtain, based on the mapping relationship between the biometric information and the user ID, the user ID corresponding to the received biometric information.

14. The device according to claim 13, wherein the biometric information comprises at least one of: a facial feature, a voiceprint, a fingerprint, or a palm print.

15. The device according to claim 10, wherein the at least one processor is further configured to execute the instructions to:
receive user location information sent by a positioning device and an image corresponding to the user location information;
obtain commodity browsing behavior information of the user based on the user location information, the image corresponding to the user location information, and commodity layout information of the shopping venue;
receive order data of the user at the shopping venue and commodity information corresponding to the order data; and
store the commodity browsing behavior information, the order data, and the commodity information corresponding to the order data as the historical offline shopping data of the user.

16. The device according to claim 10, wherein the AR display information comprises a location of a shelf in the shopping venue where the recommended commodity is located and further comprises information of the recommended commodity.

17. The device according to claim 16, wherein the shelf is within the current scene captured by the terminal of the user.

18. A non-transitory computer-readable storage medium storing instructions which, when executed by a processor of a device, cause the device to perform an offline shopping guide method, the method comprising:
obtaining, by a registration device associated with a shopping venue, QR code information from a user;
collecting, by the registration device, biometric information of the user;
receiving the biometric information of the user and the QR code information uploaded by the registration device;
parsing the QR code information to obtain a user identifier (ID);
establishing and storing a mapping relationship between the biometric information of the user and the user ID;
obtaining the user ID of the user based on the mapping relationship between the biometric information and the user ID, and a scene ID of the shopping venue where the user is located;
obtaining historical offline shopping data and historical online shopping data of the user according to the user ID, and obtaining commodity information of the shopping venue according to the scene ID;
obtaining a recommended commodity to the user according to the historical offline shopping data, the historical online shopping data, and the commodity information; and
sending augmented reality (AR) display information of the recommended commodity to a terminal of the user;
wherein when the recommended commodity is outside a current scene captured by the terminal, the sending the AR display information to the terminal comprises:

sending image data and AR navigation information associated with the recommended commodity to the terminal, wherein the AR navigation information is configured to perform navigation, and the image data is configured to locate the recommended commodity within a real scene captured by the terminal by matching images of commodities in the real scene with the image data.

* * * * *